Aug. 28, 1962   J. B. MORSE ETAL   3,050,770
WALL BUMPER
Filed April 14, 1960
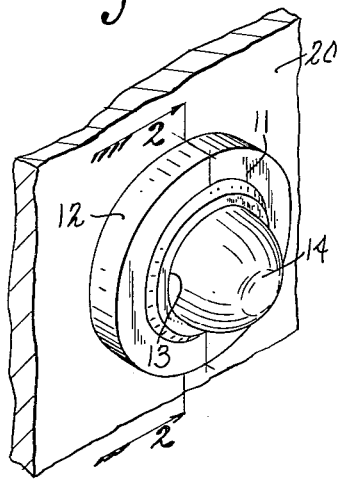
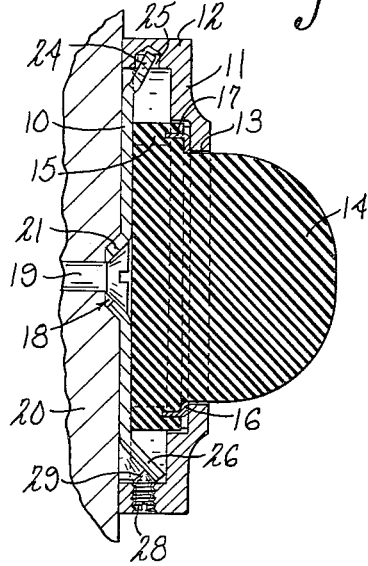
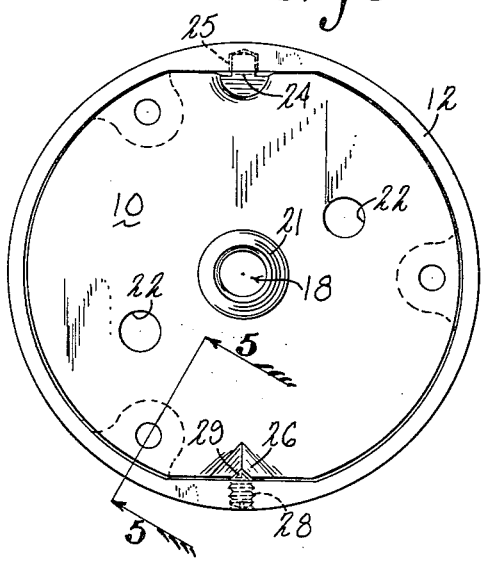
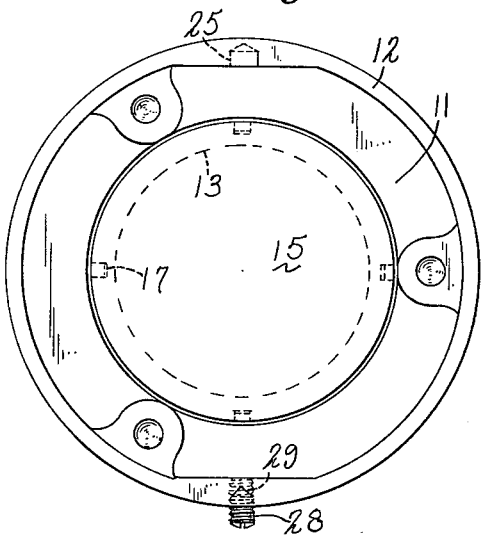
INVENTORS
John B. Morse
BY Fritz C. Benson
Rockwell & Buttelow
ATTORNEYS

United States Patent Office 3,050,770
Patented Aug. 28, 1962

3,050,770
WALL BUMPER
John B. Morse, Hamden, and Fritz C. Benson, West Haven, Conn., assignors to The H. B. Ives Company, New Haven, Conn., a corporation of Connecticut
Filed Apr. 14, 1960, Ser. No. 22,344
1 Claim. (Cl. 16—86)

This invention relates to wall bumpers and more particularly to a form of wall bumper or door stop adapted to be placed on the wall in position to contact the knob of the door.

In some instances it is not practical to secure a door stop or bumper upon the baseboard or floor of a room, and in that event bumpers are secured to the wall, usually in a position to register with the door knob and contact the latter to limit the opening of the door so that the knob will not strike the wall itself. As illustrated, the invention relates to a wall bumper of this type.

When this type of bumper is employed it is desirable to provide means for securing the bumper or stop to the well by means which will ordinarily be concealed so that the bumper structure will present a more ornamental appearance. To this end the persent structure comprises a rear plate adapted to be secured to the wall and a front section adapted to be secured to the rear plate by means which will ordinarily be concealed. The bumper itself made of some type of deformable material such as rubber will be supported by the front member and project outwardly through an opening therein while being clamped between the rear and front members of the frame.

In order to provide concealed means for securing the front member to the rear plate, the latter is provided at one portion of its periphery with an outwardly projecting lug and at an opposite point in its periphery with a recess formed by displacing the metal of the plate outwardly, this recess facing radially outwardly to receive a screw or other adjustable member. The front member of the bumper is of cuplike shape having a front wall provided with an opening through which the deformable bumper member projects and a flange extending rearwardly from the front wall engaging the rear plate. This flange is provided with an inwardly facing recess adapted to receive the outwardly projecting lug on the rear plate and with a set screw or other adjustable member adapted to be received in the recess in the rear plate. This screw will usually be arranged upon the lower side of the structure so that it will be concealed and in any event is a headless or grub screw so that it may be set in a position flush with the exterior of the flange on the front section of the structure.

One object of the invention is to provide a new and improved wall bumper which may be inexpensively manufactured and which may be readily secured in place upon a wall adjacent a door.

A further object of the invention is to provide a wall bumper of the character described wherein the bumper may be secured to the wall by concealed means.

Still another object of the invention is to provide a wall bumper consisting of front and rear sections or parts so constructed that the rear section may be secured to the wall and the front section secured to the rear section by concealed means with the deformable bumper member clamped between the front and rear sections.

To these and other ends the invention consists in the novel features and combinations of parts to be hereinafter described and claimed.

In the accompanying drawing:

FIG. 1 is a perspective view of a wall bumper mounted upon a wall and embodying our improvements;

FIG. 2 is a sectional view on line 2—2 of FIG. 1;

FIG. 3 is a rear elevational view of the bumper structure removed from the wall; and FIG. 4 is a view similar to FIG. 3 with the rear plate section removed.

To illustrate one embodiment of our invention we have shown a wall bumper comprising a rear plate section 10 of substantially disklike form and a front section illustrated as being of cup-shaped form in that it has a front wall portion 11 and a rearwardly projecting annular flange 12 at the outer periphery of the front wall. The latter is provided with an opening 13 through which projects the dome-shaped section 14 of the bumper of deformable material. This member is provided with a flanged or base portion 15 of greater diameter than the opening 13. As shown in FIG. 2, this base portion will be clamped between the front wall 11 and the rear plate member 10.

A washer member 16 which will usually be metallic lies between the outer surface of the base 15 of the bumper and the edge of the front wall 11 surrounding the dome-shaped portion 14, this washer being provided with spaced prongs 17 adapted to be embedded into the base 15 when the front and rear sections are secured together.

The rear plate member 10 is provided with a central opening 18 adapted to receive a fastening member such as the screw 19 to secure the plate 10 to the wall 20. The metal of the plate may be displaced inwardly about this opening as shown at 21 and provide a countersunk portion to receive the beveled head of the screw so that the outer surface of the screw head will lie flush with the outer surface of the plate. The plate 10 may also be provided with openings 22 (FIG. 3) to receive additional fastening members so that the bumper will not tend to become loose and rotate about the screw 19.

As previously stated, concealed means are provided for securing the front flanged section of the bumper structure to the rear plate 10 which will now be described. For this purpose a tongue or lug 24 is struck outwardly from the plate 10 adjacent a peripheral edge thereof, this lug having a free end adapted to be received in an inwardly facing recess 25 provided at the inner surface of the flange 12. At another point on the periphery of the plate 10 which will preferably be diametrically opposite the lug 24 (this plate being substantially circular) the metal of the plate is displaced outwardly, as shown at 26, to provide a radially outwardly facing recess to receive the inner end of a set screw 28 threadedly mounted in the flange 12.

In mounting the device upon a wall, the plate 10 is first secured in place by the screw 19. The lower portion of the front section is then tilted outwardly and the recess 25 placed over the lug or tongue 24. The lower end of this outer section is then moved inwardly against the wall, as shown in FIG. 2, and the screw 28 is turned in so that its inner beveled end 29 engages the wall 26 of the recess in the lower portion of the plate 10 and wedges the front section of the bumper structure tightly in place. The base 15 of the deformable bumper will be clamped tightly between the front and rear sections and the washer 16 will thwart any attempt to pull the bumper outwardly through the opening 13.

While we have shown and described a preferred embodiment of our invention, it will be understood that it is not to be limited to all of the details shown, but is capable of modification and variation within the spirit of the invention and within the scope of the claim.

What we claim is:

A wall bumper for doors comprising a rear plate member, means securing said plate member to a wall, a front member having a front wall portion with an opening therein and a rearwardly extending flange engaging the plate member, the latter having a lug projecting forwardly therefrom adjacent an edge portion thereof and an outwardly facing recess at another edge portion, said flange having an inwardly facing opening to receive said lug, and a fastening member adjustably mounted in said flange and adapted to be received in the recess in the plate member to secure said front and rear members together, and a deformable bumper member having a flange portion and a domed portion, the flange portion being clamped between the front member and the rear plate and the domed portion extending through an opening in the front wall of the front member, and a washer disposed between said flange and the front wall of the front member and provided with prongs embedded in said flange portion.

References Cited in the file of this patent
UNITED STATES PATENTS

| | | |
|---|---|---|
| 2,182,611 | Covert | Dec. 5, 1939 |
| 2,461,259 | Ciarfello | Feb. 8, 1949 |
| 2,899,703 | Johnson | Aug. 18, 1959 |

FOREIGN PATENTS

| | | |
|---|---|---|
| 5,393 | Great Britain | Apr. 19, 1886 |